US007149002B2

(12) United States Patent  (10) Patent No.: US 7,149,002 B2
Clifton  (45) Date of Patent: Dec. 12, 2006

(54) SCANNER INCLUDING CALIBRATION TARGET

(75) Inventor: Lori Clifton, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1335 days.

(21) Appl. No.: 09/746,333

(22) Filed: Dec. 21, 2000

(65) Prior Publication Data

US 2002/0080427 A1 Jun. 27, 2002

(51) Int. Cl.
H04N 1/04 (2006.01)
H04N 1/46 (2006.01)

(52) U.S. Cl. ............ 358/474; 358/406; 358/497; 358/401; 358/461; 358/504; 358/505; 358/501; 358/296

(58) Field of Classification Search ............ 358/406, 358/461, 497, 494, 474, 471, 504, 505, 501, 358/500, 400, 401, 296, 506, 509, 512–514, 358/483, 482, 448, 443; 382/312, 315, 318, 382/319; 399/211, 212, 377–380, 372, 13; 250/234–236, 239, 216, 208.1; 255/1.15, 255/1.3

See application file for complete search history.

(56) References Cited

U.S. PATENT DOCUMENTS

| 3,800,079 | A |   | 3/1974 | McNeil et al. ............ 348/247 |
| 3,867,569 | A |   | 2/1975 | Watson .................... 358/483 |
| 4,216,503 | A |   | 8/1980 | Wiggins ................... 358/446 |
| 4,555,732 | A |   | 11/1985 | Tuhro ..................... 348/241 |
| 4,605,970 | A |   | 8/1986 | Hawkins ................... 358/406 |
| 4,757,389 | A | * | 7/1988 | Clark et al. ............... 358/406 |
| 5,047,871 | A |   | 9/1991 | Meyer et al. .............. 358/486 |
| 5,194,966 | A |   | 3/1993 | Quardt et al. ............. 358/406 |
| 5,214,518 | A | * | 5/1993 | Kato ...................... 358/448 |
| 5,363,318 | A |   | 11/1994 | McCauley ................. 358/512 |
| 5,404,232 | A | * | 4/1995 | Selby ..................... 358/406 |
| 5,563,723 | A |   | 10/1996 | Beaulieu et al. ........... 358/461 |
| 5,621,217 | A |   | 4/1997 | Seachman et al. .......... 250/559.1 |
| 5,651,623 | A |   | 7/1997 | Stodder et al. ............ 400/605 |
| 5,727,890 | A |   | 3/1998 | Stodder et al. ............ 400/624 |
| 5,738,454 | A |   | 4/1998 | Zepeda et al. ............. 400/625 |
| 5,800,083 | A |   | 9/1998 | Gaarder et al. ............ 400/185 |
| 5,954,326 | A |   | 9/1999 | Gaarder et al. ............ 271/9.02 |
| 6,011,906 | A |   | 1/2000 | Muroki et al. ............. 395/1.9 |
| 6,016,207 | A |   | 1/2000 | Wield ..................... 358/406 |
| 6,094,512 | A | * | 7/2000 | Lin et al. ................. 382/315 |
| 6,111,244 | A | * | 8/2000 | Wang ...................... 250/208.1 |
| 6,226,105 | B1 | * | 5/2001 | Fukushi ................... 358/452 |
| 6,327,047 | B1 | * | 12/2001 | Motamed .................. 358/1.15 |

* cited by examiner

Primary Examiner—Cheukfan Lee

(57) ABSTRACT

A scanner includes a transparent scanning window; a housing, the housing including a first side supporting the scanning window and a second side opposite the first side; a scanning array movable in the housing relative to the scanning window along a scanning path, the scanning array generally facing the first side; a light source movable with the scanning array, the light source generally facing the first side; and a calibration target supported by the housing within the scanning path, the calibration target generally facing the second side. A method of manufacturing a scanner includes providing a scanner including a transparent scanning window; a housing, the housing including a first side supporting the scanning window and a second side opposite the first side; a scanning array movable in the housing relative to the scanning window along a path, the scanning array facing the first side; and a light source movable with the scanning array and facing the first side; and supporting a calibration target from the housing, within the scanning path, the calibration target facing the second side.

18 Claims, 4 Drawing Sheets

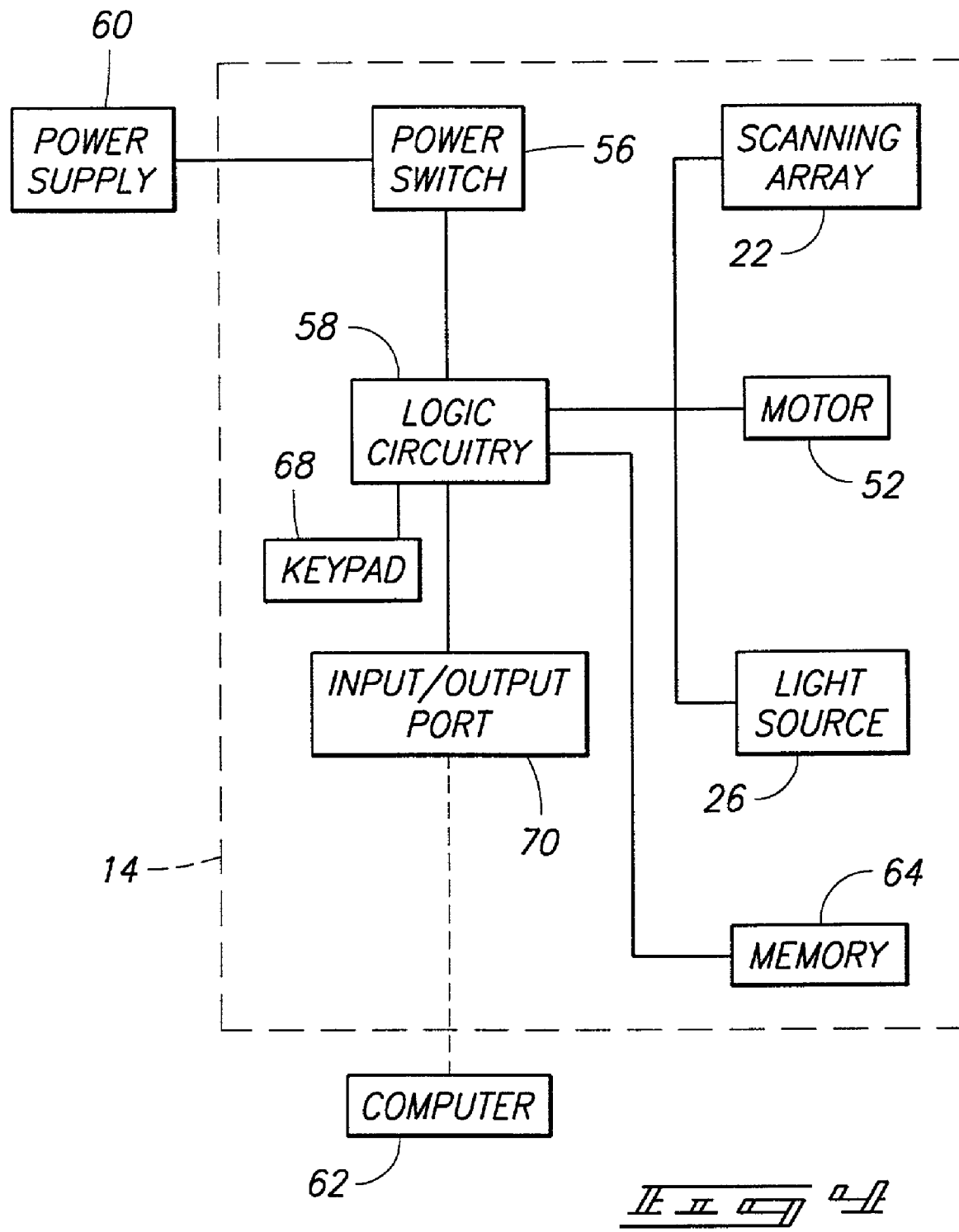

SCANNER INCLUDING CALIBRATION TARGET

FIELD OF THE INVENTION

The invention relates to optical scanners. More particularly, the invention relates to calibration of scanners, and to multi-function devices including scanners.

BACKGROUND OF THE INVENTION

Optical scanners are known in the art. In an optical scanner, a light source is directed toward a document while an array of photo detectors or charge coupled device (CCD) elements, which define imaging pixels, scan the document. The array detects light reflected from images or text on the document during a scanning pass. Digital data is generated based on the light detected by the array, which in turn is based on the image or text on the document. The digital data can be, for example, analyzed by optical character recognition (OCR) software to convert from raw digital pixel data or image data into text capable of being manipulated by a word processor, or can be imported into a graphics software program for image editing.

It is known to calibrate such scanners. For example, because of manufacturing non-uniformity, dust or contaminates, or other causes, system response for imaging pixels may not be the same from pixel to pixel. Compensation for pixel-to-pixel variation may be provided, for example, in the charge measuring process by multiplying the output value for each photo detector by a gain value and then adding an offset value. Various methods of calibrating scanners are known in the art. For example, one calibration process involves sampling imaging pixels in response to scanning of a target of known characteristics, such as a white, grey, or black sample and then calculating required gain and offset values. See, for example, U.S. Pat. No. 5,563,723 to Beaulieu et al., which is incorporated herein by reference.

U.S. Pat. No. 4,605,970 to Hawkins, which is incorporated herein by reference, discloses calibrating an optical document digitizer in which a calibration strip is mounted to a rotatable drum of the digitizer. The calibration strip has an optical pattern of contrasting light and dark areas. The optical pattern has plural discrete blocks. Each of the blocks have first and second orthogonal edges. The first edges are precisely aligned with the axis of the drum and provide a scanning reference line for a Y-coordinate axis and trigger scanning in the Y-direction.

U.S. Pat. No. 5,194,966 to Quardt, which is incorporated herein by reference, discloses a method for calibrating an optical scanner by repetitively scanning a calibration sheet that has lines at a forty-five degree angle to the path of the document through the scanner and that has a predetermined image dot count. The sheet is repetitively scanned until scanner threshold values are determined which satisfy predetermined relationships with the dot count.

Multi-function devices are known in the art. For example, the assignee of the present invention manufactures multi-function devices such as devices including both a scanner and a printer in a common housing. By providing scanning and printing capabilities, the device can also function as a copier. Some multi-function devices include a color scanner and a monochrome (e.g. black and white or greyscale) printer. This is often true when the printer of the multi-function device is a laser printer. In such systems, monochrome printouts of scanned color documents may not show possible calibration problems with the color scanner.

SUMMARY OF THE INVENTION

The invention provides a scanner including a built-in calibration target. More particularly, one aspect of the invention provides a scanner including a transparent scanning window, and a housing. The housing includes a first side supporting the scanning window and a second side opposite the first side. A scanning array is movable in the housing relative to the scanning window along a scanning path. The scanning array generally faces the first side. A light source is movable with the scanning array. The light source generally faces the first side. A calibration target is supported within the scanning path. The calibration target generally faces the second side in operation.

Another aspect of the invention provides a method of manufacturing a scanner. The method comprises providing a scanner including a transparent scanning window; a housing, the housing including a first side supporting the scanning window and a second side opposite the first side; a scanning array movable in the housing relative to the scanning window along a path, the scanning array facing the first side; and a light source movable with the scanning array and facing the first side; and supporting a calibration target from the housing, within the scanning path, the calibration target facing the second side in operation.

Advantages of at least some embodiments of the invention include the fact that no test targets are required to be placed on the scanning window, and no user intervention is required.

Other features and advantages of the invention will become apparent to those of ordinary skill in the art upon review of the following detailed description, claims, and drawings.

DESCRIPTION OF THE DRAWINGS

FIG. 4 is a block diagram of the scanner included in the multi-function device of FIG. 1, and also shows a power supply of the multi-function device, and a computer coupled to the multi-function device.

DETAILED DESCRIPTION OF PREFERRED EMBODIMENTS

Figure 1:
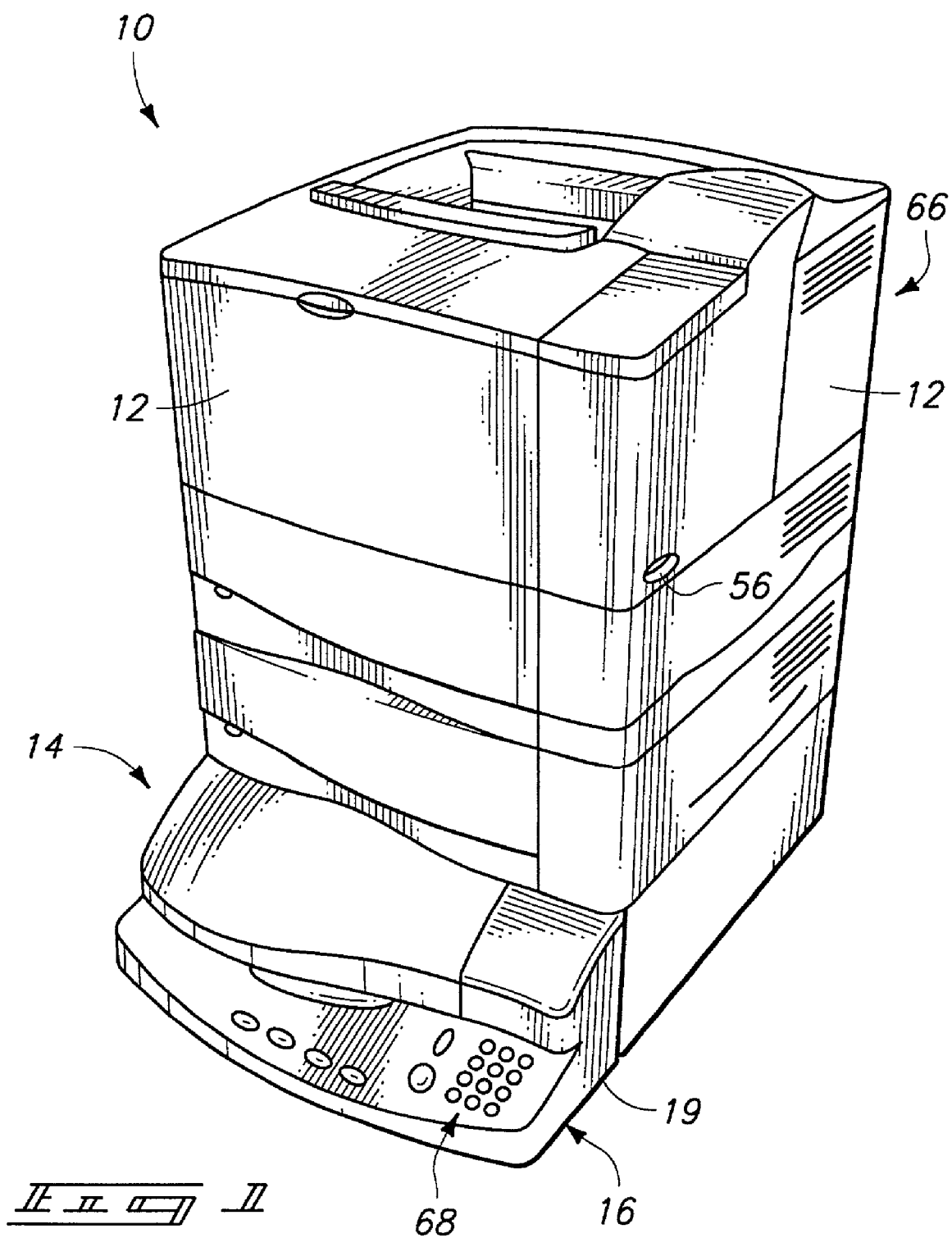
FIG. 1 is a perspective view of a multi-function device.
Figure 2:
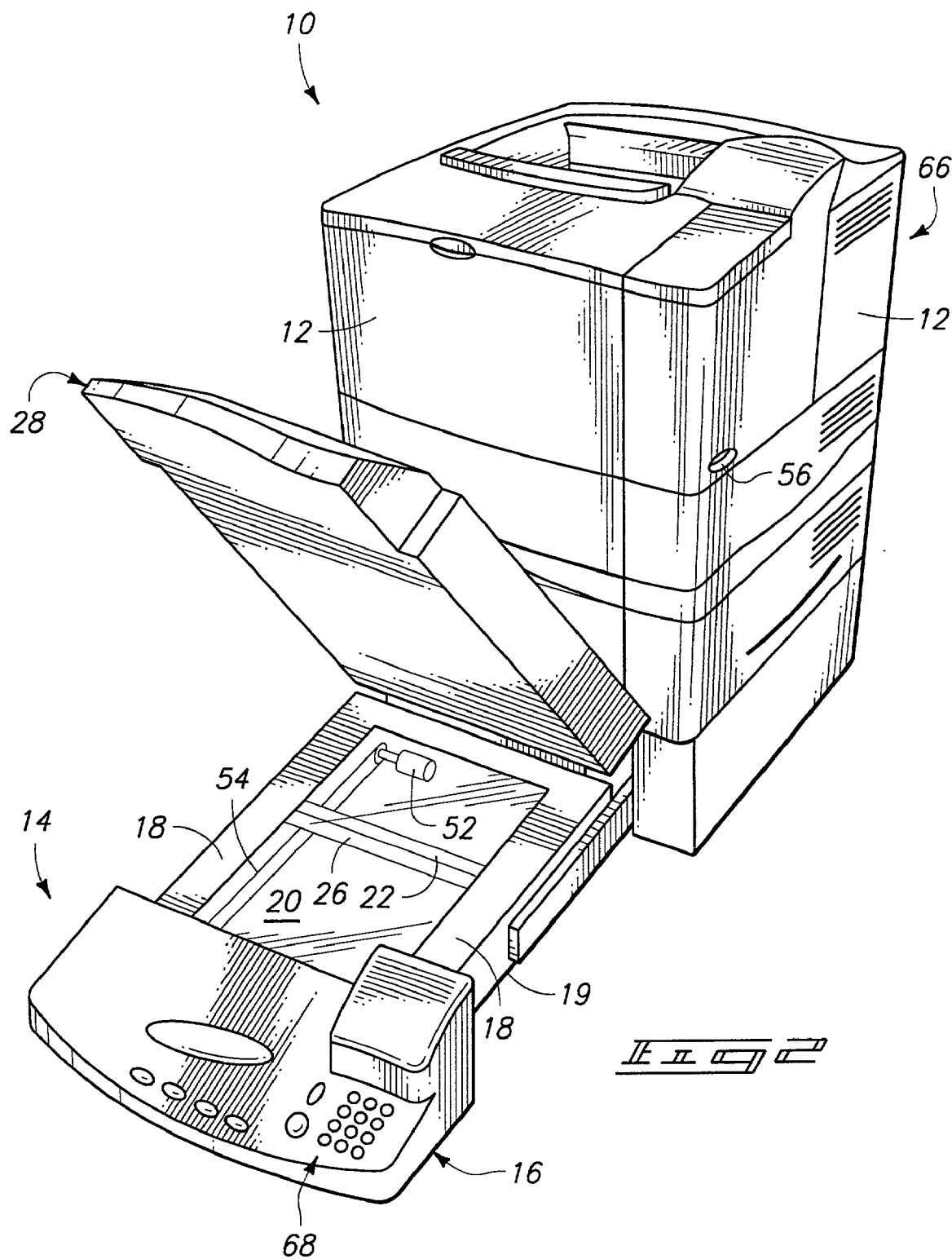
FIG. 2 is a perspective view of the multi-function device of FIG. 1 with a scanner thereof shown in a use position.

FIG. 1 shows a multi-function device 10 in accordance with one embodiment of the invention. The multi-function device 10 has a housing 12. The multi-function device 10 further includes a scanner 14 supported in the housing 12.

The scanner 14 includes a sub-housing 16. The sub-housing 16 has a first or top side 18, and a second or bottom side 19, opposite the top side 18. The sub-housing 16 is slidably mounted in the housing 12 in the illustrated embodiment; however, in another embodiment, the sub-housing 16 is not movable relative to the housing 12.

The scanner 14 includes a transparent scanning window 20 manufactured, for example, of clear glass or plastic. The window 20 is supported by or proximate the top side 18. The scanning window 20 defines a support surface for a document to be scanned. The scanning window 20, in the illustrated embodiment, is sufficiently large to support standard size documents for scanning, e.g., A4, 8.5×11, possibly even legal size or larger. The scanning window 20 has a length L and width W.

The scanner 14 further includes a scanning array 22 movable in the housing relative to the scanning window 20 along a scanning path in the direction along the length L. The scanning array 22 generally faces the first side 18 so as to be able to scan a document placed on the scanning window 20. The scanning array 22 is defined by photo detectors or charge coupled device (CCD) elements which define imaging pixels. The scanning array 22 extends, for example, across the width W of the scanning window 20 and slightly beyond, and has a short length. In the illustrated embodiment, the scanning array is a color capable scanning array, capable of scanning color documents and being able to generate signals indicative of the colors that were scanned at different locations of the scanned document.

The scanner 14 further includes a light source 26 movable with the scanning array 22. The light source 26 generally faces the first side 18 so as to shine light on an area of a document placed on the scanning window 20. The light source 26 extends, for example, across the width W of the scanning window 20 and has a short length. The light source 26 may be defined by a tubular fluorescent light, for example.

The scanning array 22 detects light reflected from images or text on the document during a scanning pass. Digital data is generated based on the light detected by the array, as is known in the scanning art.

The scanner 14 further includes a cover 28, pivotally mounted to the sub-housing 16, for selectively covering the document to be scanned and thereby shielding the scanning array 22 from light outside of the sub-housing 16. In the illustrated embodiment, the window 20 takes up less than the entire area of the top side 18 to aid in shielding of light when the cover 28 is placed on the document, among other reasons. Because the window 20 takes up less than the entire area of the top side 18, light leakage around the edges of cover 28 has reduced adverse affect.

Figure 3:
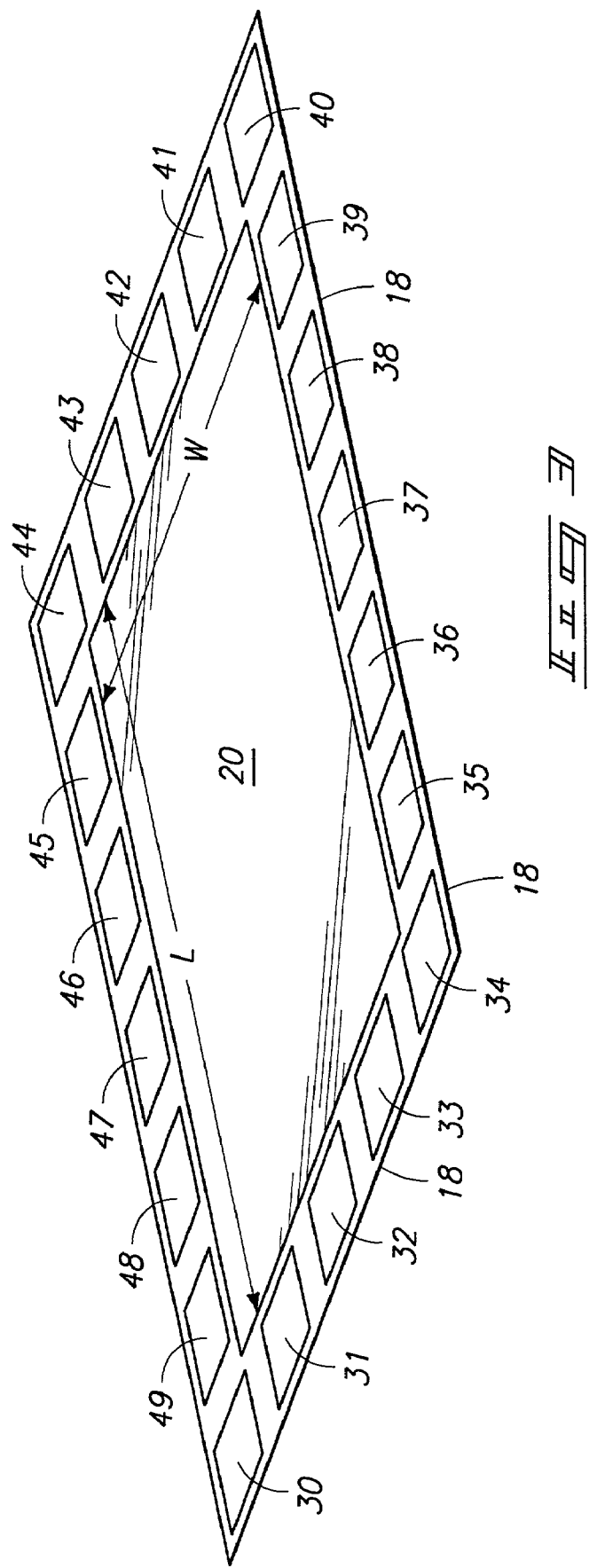
FIG. 3 is a bottom view of a portion of a housing of the multi-function device of FIG. 2, which portion includes a scanning window.

The scanner 14 includes (see FIG. 3) a plurality of calibration targets 30–49 supported by the housing, within the scanning path. For example, the calibration targets 30–49 are printed on the lower surface of the top side 18 of the sub-housing 16, or formed on plates, stickers, or plaques glued onto the lower surface of the top side 18 of the sub-housing 16, or molded into the sub-housing 16 or the cover 28. The calibration targets 30–49 generally face the bottom side 19 so as to be scannable by the scanning array 22. In one embodiment, the calibration targets 30–49 are supported inside the sub-housing 16 from the top side 18. For example, in the illustrated embodiment, the targets 30–49 are located proximate the scanning window 20 so as to be readily scannable by the scanning array 22. In the illustrated embodiment, the targets 30–49 are placed, spaced apart, along each of the four sides of the scanning window 20, so that a maximum number of locations can be included.

The targets 30–49 can be formed on separate plates, stickers, or plaques, or multiple targets can be formed on a single plate, sticker, or plaque. In the illustrated embodiment, the targets 30–49 are spaced apart from each other, and located around the scanning window. In the illustrated embodiment, the targets include one or more each of RGB targets (e.g., a red target 30, a blue target 31, and a green target 32), and one or more each of black and white targets (e.g., black target 33 and white target 34). In one embodiment, RGB and/or black and white targets are provided along each of the four sides of the scanning window. Note, however, that the targets can have any appropriate test pattern. Because different scanner models will have different vulnerabilities, different test patterns will be used in different embodiments.

The scanner 14 further includes a motor 52 in the sub-housing 16 to move the scanning array 22 and light source 26 together along the scanning path; e.g., by driving a belt or chain 54.

The scanner 14 further includes a power switch 56, coupled to the scanning array 22, light source 26 and the motor 52, and to a power supply 60, for turning the scanner 14 on and off (see FIG. 4). In the illustrated embodiment, the power switch 56 is a conventional mechanical switch. In an alternative embodiment, the power switch 56 is a soft or logic based power switch or circuit that is activated in response to a signal, e.g., from a computer 62. Such soft power switch circuits are known, for example, in printers and copiers that enter a standby mode after there has been a period of inactivity, and that are then powered up in response to receiving a job.

The scanner 14 further includes logic circuitry coupled to the power switch 56, the scanning array 22, the motor 52, and the light source 26. The logic circuitry 58 is used to control the light source 26, movement of the scanning array (by controlling the motor 52), and reads signals generated by elements of the scanning array 22 to generally control scanning and provide an output signal indicative of the image that was scanned to the computer 62, in a conventional manner.

The logic circuitry 58 is also configured to effect movement of the scanning array 22, e.g., by sending a control signal to the motor 52, and to cause scanning of the calibration targets 30–49 in response to the scanner 14 being turned on. The logic circuitry 58 then uses scanned information from the calibration targets 30–49 to perform a calibration in the conventional manner that would be used if a conventional target was placed on the scanning window. For example, calibration methods are described in the following U.S. Patents, which are incorporated herein by reference: U.S. Pat. No. 3,800,079 to McNeil et al.; U.S. Pat. No. 3,867,569 to Watson; U.S. Pat. No. 4,216,503 to Wiggins; U.S. Pat. No. 4,555,732 to Tuhro; U.S. Pat. No. 4,605,970 to Hawkins; and U.S. Pat. No. 5,621,217 to Seachman et al.; and U.S. Pat. No. 6,016,207 to Wield.

For example, during the calibration process, the scanner 14 causes the light source 26 to illuminate targets 30–49 e.g., in a predetermined sequence or all in one pass. The light reflected from the targets is directed towards the scanning array 22. The scanning array 22 converts the light into electrical signals corresponding to digital image data representing the image that has been scanned, namely the image of the targets. The image data is provided to the logic circuitry 58 which produces offset and gain correction data for each sensor pixel by comparing with predetermined or premeasured reflectance values stored in a memory 64 for multiple areas of the targets 30–49 or multiple areas of the targets. The logic circuitry 58 produces the offset and gain correction data by comparing the signal from each of the sensor's pixels with the predetermined value for the targets. This correction data is stored in memory 64 and used to correct the gain and offset of each pixel during subsequent normal scanning, thus providing a signal representative of image data which is calibrated and corrected for any errors in the sensor array or variations in the properties of the light source 26.

The calibration performed by the logic circuitry 58 includes color registration, in one embodiment.

Alternatively or in addition to performing a calibration upon power-up, the logic circuitry 58 effects calibration in response to a signal requesting calibration generated by a switch or keypad sequence on the multi-function device, or generated by the computer 62 coupled to the multi-function device.

The scanner 14 may include other components typically included in scanners, such as scanners presently manufactured by the assignee of the present invention. See, for example, U.S. Pat. No. 5,047,871 to Meyer et al., assigned to the assignee of the present invention and incorporated herein by reference. Basic scanner design is described in U.S. Pat. No. 3,867,569 to Watson (incorporated herein by reference).

The multi-function device 10 further comprising a monochrome printer 66 commonly housed with the scanner 14 in the sub-housing 16. The multi-function device 10 further includes a control keypad 68 supported by the sub-housing 16 and coupled to the logic circuitry 58. In one embodiment, the logic circuitry 58 controls various functions of the printer 66, as well as functions of the scanner, and the keypad 68 provides a user input mechanism for controlling the logic circuitry 58. The multi-function device 10 further includes an input port, such as a bi-directional parallel port 70, using which user input can be received from the computer 62 instead of or in addition to input from the keypad 68.

By combining a printer with a scanner, copying functionality can be provided, in addition to faxing, printing, and scanning functionality. In the illustrated embodiment, the multi-function device further includes a modem supported by the housing and coupled to the logic circuitry. An advantage of a monochrome printer is lower cost. Many users only require black and white printing, e.g., for letters or documents, whereas they may wish to scan and e-mail color photographs. Color printers, particularly high quality laser printers, can be quite expensive. By combining a monochrome high quality printer with a color scanner, high quality can be achieved for both the printing and scanning functions. Multifunction devices including scanners and printers are known in the art. The multifunction device includes at least the typical features and functionality of existing multifunction devices, in addition to the functionality associated with calibration (e.g., calibration buttons, signals, and logic). The typical features are described, for example, in U.S. patents, which are incorporated herein by the following reference: U.S. Pat. No. 5,651,623 to Stodder et al.; U.S. Pat. No. 5,727,890 to Stodder et al.; U.S. Pat. No. 5,738,454 to Zepeda et al; U.S. Pat. No. 5,800,083 to Gaarder et al; and U.S. Pat. No. 5,954,326 to Gaarder et al.

Thus, a system has been provided where no test targets are required to be placed on the scanning window in order to perform a calibration.

The protection sought is not to be limited to the disclosed embodiments, which are given by way of example only, but instead is to be limited only by the scope of the appended claims.

What is claimed is:

1. A multi-function device comprising:
    a housing;
    a printer supported in the housing;
    a scanner supported in the housing, the scanner including:
        a transparent scanning window;
        a sub-housing, the sub-housing including an inside, an outside, a first side supporting the scanning window, having an inside surface and having an outside surface, and a second side having an inside surface opposite the inside surface of the first side and having an outside surface;
        a scanning array movable in the sub-housing relative to the scanning window along a scanning path;
        a light source movable with the scanning array, the light source generally facing the first side; and
        a plurality of calibration targets supported inside the sub-housing within the scanning path, on the inside surface of the first side and spaced apart from the scanning window, the calibration targets generally facing the inside surface of the second side, in operation.

2. A device in accordance with claim 1 wherein the scanning array is a color capable scanning array.

3. A device in accordance with claim 2 wherein the printer is a monochrome printer.

4. A device in accordance with claim 1 wherein the targets include a color target.

5. A device in accordance with claim 1 wherein the targets include a black target.

6. A device in accordance with claim 1 wherein the targets are color calibration targets, and wherein the scanner is configured to use the color calibration targets for color registration.

7. A device in accordance with claim 1 and further including a motor configured to move the scanning array along the scanning path, a power switch, coupled to the scanning array and the motor, for turning the scanner on and off, and logic circuitry coupled to the power switch, the scanning array, and the motor, and configured to effect movement of the scanning array to scan the calibration target in response to the scanner being turned on.

8. A device in accordance with claim 7 wherein the targets are color calibration targets wherein the logic circuitry is further configured to perform a calibration in response to scanning the first mentioned, second, and third color calibration targets.

9. A method of manufacturing a multifunction device, the method comprising:
    providing a housing;
        supporting a printer in the housing;
        supporting a scanner in the housing, the scanner including a transparent scanning window; a sub-housing, the sub-housing including an inside, an outside, a first side supporting the scanning window, having an inside surface and having an outside surface, and a second side having an inside surface opposite the first side and having an outside surface; a scanning array movable in the sub-housing relative to the scanning window along a path, the scanning array being configured to scan the inside surface of the first side; and a light source movable with the scanning array and facing the first side in operation; and
    attaching a plurality of calibration targets inside the sub-housing, on the inside surface of the first side, within the scanning path, the calibration targets facing the second side, prior to delivery to an end user.

10. A method in accordance with claim 9 wherein the scanning array is color capable.

11. A method in accordance with claim 10 wherein the printer is a monochrome printer.

12. A method in accordance with claim 9 wherein the calibration target is a color target.

13. A method in accordance with claim 9 wherein the calibration targets include a black target.

14. A method in accordance with claim 9 wherein the targets include color calibration targets, the method further comprising using the color calibration targets for color registration.

15. A method in accordance with claim 9 and further comprising effecting scanning of the calibration targets by the scanning array in response to the scanner being powered-up.

16. A method in accordance with claim 15 and further comprising calibrating the scanner in response to scanning of the calibration targets.

17. A multifunction device comprising:
- a housing having a first side and a second side opposite the first side;
- a monochrome printer supported in the housing; and
- a color flatbed scanner supported in the housing, the scanner including a sub-housing having an inside, an outside, a top side having an inside surface and an outside surface, and a bottom side opposite the top side and having an inside surface and an outside surface, the scanner including a transparent window, supported by the top side of the sub-housing, a scanning array movable in the sub-housing relative to the window along a scanning path, the scanning array generally facing the inside surface of the top side so as to be able to scan the window, first, second, and third color calibration targets supported inside the housing, attached to the inside surface of the top side, spaced apart from the window, within the scanning path, the calibration targets facing the inside surface of the bottom side, a motor configured to move the scanning array along the scanning path, a power switch, coupled to the scanning array and the motor, for turning the scanner on and off, and logic circuitry coupled to the power switch, the scanning array, and the motor, and configured to effect movement of the scanning array to scan the calibration targets in response to the scanner being turned on.

18. A multifunction device in accordance with claim 17 wherein the logic circuitry is further configured to perform a calibration in response to scanning the first, second, and third color calibration targets.

* * * * *